US007818376B2

(12) United States Patent
Galli et al.

(10) Patent No.: US 7,818,376 B2
(45) Date of Patent: Oct. 19, 2010

(54) OFF RECORD CHAT

(75) Inventors: Doreen Lynn Galli, Smyrna, GA (US);
Rick Allen Hamilton, II,
Charlottesville, VA (US); James Wesley Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 2385 days.

(21) Appl. No.: 10/392,664

(22) Filed: Mar. 19, 2003

(65) Prior Publication Data

US 2004/0186885 A1  Sep. 23, 2004

(51) Int. Cl.
*G06F 15/16* (2006.01)
(52) U.S. Cl. .................. 709/206; 709/204; 709/205; 709/207
(58) Field of Classification Search .......... 709/204–207
See application file for complete search history.

(56) References Cited

U.S. PATENT DOCUMENTS

| 5,958,005 | A   * | 9/1999  | Thorne et al. ............... 709/202 |
| 6,119,101 | A     | 9/2000  | Peckover ..................... 705/26 |
| 6,205,432 | B1    | 3/2001  | Gabbard et al. .............. 705/14 |
| 6,230,186 | B1  * | 5/2001  | Yaker ......................... 709/206 |
| 6,301,609 | B1    | 10/2001 | Aravamudan et al. ....... 709/207 |
| 6,324,569 | B1  * | 11/2001 | Ogilvie et al. .............. 709/206 |
| 6,330,554 | B1    | 12/2001 | Altschuler et al. ........... 706/21 |
| 6,338,044 | B1    | 1/2002  | Cook et al. .................. 705/14 |
| 6,721,784 | B1  * | 4/2004  | Leonard et al. ............. 709/206 |
| 6,757,365 | B1  * | 6/2004  | Bogard .................... 379/88.17 |
| 6,823,363 | B1  * | 11/2004 | Noveck et al. .............. 709/204 |
| 7,058,897 | B2  * | 6/2006  | Matsuda ...................... 715/758 |
| 7,590,696 | B1  * | 9/2009  | Odell et al. ................. 709/206 |
| 2002/0026351 | A1 | 2/2002 | Coleman ..................... 705/14 |
| 2002/0046099 | A1 | 4/2002 | Frengut et al. ............... 705/14 |
| 2002/0048349 | A1 | 4/2002 | Bixler et al. .............. 379/67.1 |
| 2002/0052919 | A1 * | 5/2002 | Morris et al. ............... 709/205 |
| 2002/0059590 | A1 | 5/2002 | Kitsukawa et al. ........... 725/36 |
| 2002/0178163 | A1 * | 11/2002 | Mayer ......................... 707/10 |
| 2003/0018725 | A1 * | 1/2003 | Turner et al. ................ 709/206 |
| 2003/0233410 | A1 * | 12/2003 | Gusler et al. ................ 709/206 |
| 2004/0049696 | A1 * | 3/2004 | Baker et al. ................. 713/201 |
| 2007/0143423 | A1 * | 6/2007 | Kieselbach et al. ......... 709/206 |
| 2010/0042690 | A1 * | 2/2010 | Wall .......................... 709/206 |

* cited by examiner

*Primary Examiner*—Thu Nguyen
*Assistant Examiner*—Brian P Whipple
(74) *Attorney, Agent, or Firm*—David A. Mims, Jr.; William Steinberg; Robert V. Wilder (57) ABSTRACT

A method and implementing instant messaging processing system are provided in which a user's presence and on-line status in a chat session are not broadcast to the chat or instant messaging participants until the user chooses to allow or enable such broadcast. Additionally, the user is enabled to selectively exclude other specified users from seeing the user's on-line status. A "preferences" screen is presented to a user to enable the user to input his or her privacy preferences during a subsequent chat session before the user actually logs-into the chat session. The instant messaging system includes means by which a local instant messaging user is enabled to view all remote users within the chat application who are monitoring the user's on-line status as a result of having the user included in the remote users' buddy lists, as well as the ability to view the on-line state of those remote users. Further, an "off the record" mode may be selectively enabled by the user to preclude remote users from recording the communications being transmitted during a chat session.

23 Claims, 10 Drawing Sheets

OFF RECORD CHAT

RELATED APPLICATIONS

Subject matter disclosed but not claimed herein is disclosed and claimed in co-pending application Ser. Nos. 10/392,766 and 10/392,767, filed on even date herewith.

FIELD OF THE INVENTION

The present invention relates generally to information processing systems and more particularly to a methodology and implementation for enabling improved processing functionality within instant messaging systems.

BACKGROUND OF THE INVENTION

The existence and continued acceptance and use of the World Wide Web and the Internet have resulted in many new and useful applications becoming available to users of the Internet. One such application which is growing in popularity is known as "instant messaging" or "IM". Various IM applications are provided from many sources but all such applications have many common features.

In general, IM applications enable a user to register with an IM server on the World Wide Web or other network using the Internet. Such applications may also be accessed through other local area and wide area networks as well. When a user accesses an IM application, the user inputs the user's personal information together with a user identification (ID) and a password. The user is then enabled to designate a user name which the user will use to identify himself or herself in subsequent "chat" sessions or in sending messages to and receiving messages from other users.

As instant messaging is becoming a very valuable tool for both personal and business communications, it is imperative that it also allows for the privacy needs of the individual user. The user must have the option to select his or her on-line visibility without compromising his ability to use the chat functions, which is not possible in today's legacy applications. Some of the current chat applications do provide an option for "who can see me", however, a user must (a) start the messaging software, such that everyone can see the user, then (b) reconfigure user preferences regarding who can see the user. Thus, the user may be exposed for a brief period of time, and even worse, if a user comes on-line only briefly and drops right back off-line, the user would give the impression to those other on-line participants that the user is avoiding them. There is no current means by which a user is provided with a standard entry which allows the user to look over the landscape and make whatever changes the user wishes to make before exposing the user to the on-line community.

Instant messaging has become an important part of both personal and business communications. Millions of users communicate using instant messaging systems every day, and as such, functionality and usability enhancements are important to the continued success of this communication tool. Instant messaging applications do, however, have serious flaws and/or shortcomings which must be corrected if they are to continue to thrive as a communications vehicle.

One such shortcoming with legacy instant messaging systems is the ability of the remote user to record the communications via a "cut-and-paste" or "file save" function. It may be very desirable to contact an on-line user immediately, yet very undesirable for that contacted user to be able to record the conversation.

Thus, there is a need for an improved methodology and system for enabling improved instant message processing in electronic communication systems.

SUMMARY OF THE INVENTION

In accordance with the present invention, there is provided an instant messaging system including means by which an "off the record" mode is selectively enabled which prohibits remote users from recording the communications being transmitted during a chat session. A "preferences" screen is presented to a user to enable the user to input his or her privacy preferences during a subsequent chat session before the user actually logs-into the chat session.

BRIEF DESCRIPTION OF THE DRAWINGS

A better understanding of the present invention can be obtained when the following detailed description of a preferred embodiment is considered in conjunction with the following drawings, in which.

DETAILED DESCRIPTION

It is noted that circuits and devices which are shown in block form in the drawings are generally known to those skilled in the art, and are not specified to any greater extent than that considered necessary as illustrated, for the understanding and appreciation of the underlying concepts of the present invention and in order not to obfuscate or distract from the teachings of the present invention.

The various methods discussed herein may be implemented within any communication device capable of receiving and transmitting signals utilized in instant messaging applications and/or chat sessions, over any inter-connection network, including but not limited to the Internet and the World Wide Web. In the present disclosure such devices include, but are not limited to, cellular and other wireless devices, laptop and personal computers and also desk top computers connected in local area or wide area networks. The present discussion will be directed to a server-based chat application although it is understood that the principles involved in the present invention may be applied, inter alia, to all of the above noted receiving and transmitting devices and systems.

Figure 1:
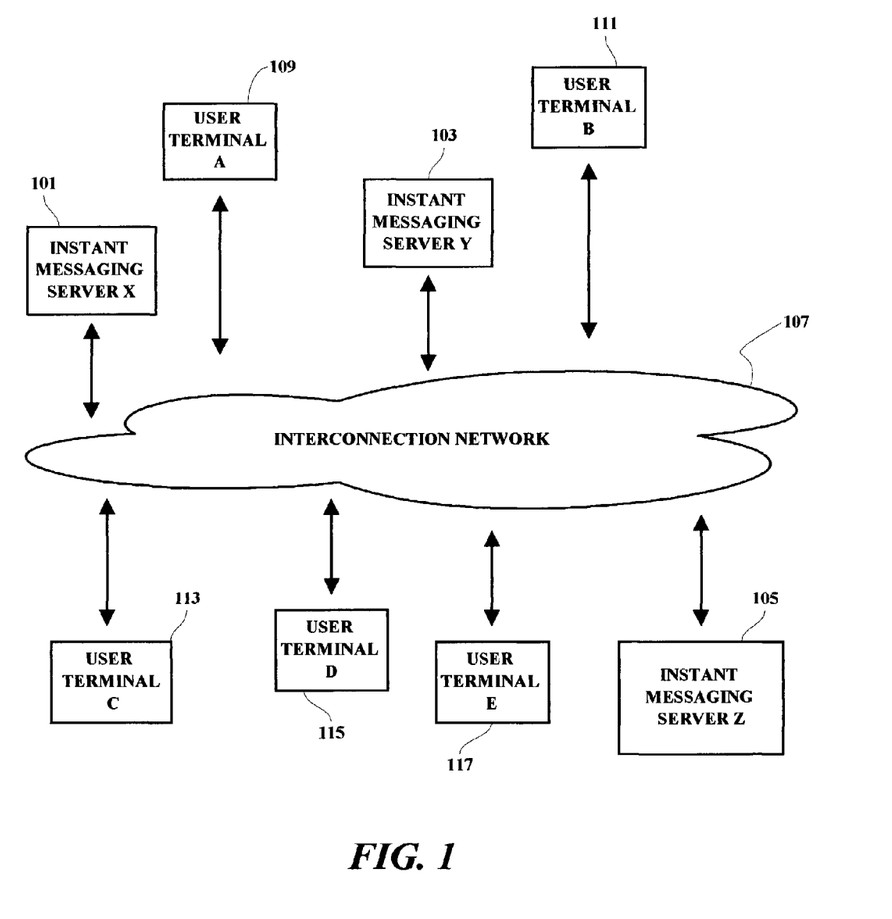
FIG. 1 is a schematic diagram illustrating a system which may be used in an exemplary implementation of the present invention.

In FIG. 1 there is shown an exemplary system in which the present invention may be implemented. The illustration shows several user terminals 109, 111, 113, 115 and 117 which may be interconnected with several instant messaging servers 101, 103 and 105 through an interconnection network 107 such as the Internet. The servers include chat session applications and the individual users terminals also include chat session programming to enable the users to "chat" with each other by exchanging communications between servers over the interconnection network 107. As noted above, the user terminals can be a desktop personal computer (PC) or any information processing device, such as a cellular phone or personal digital assistant device, which may be connected as shown in FIG. 1 through a hard-wired or wireless system arrangement.

Figure 2:
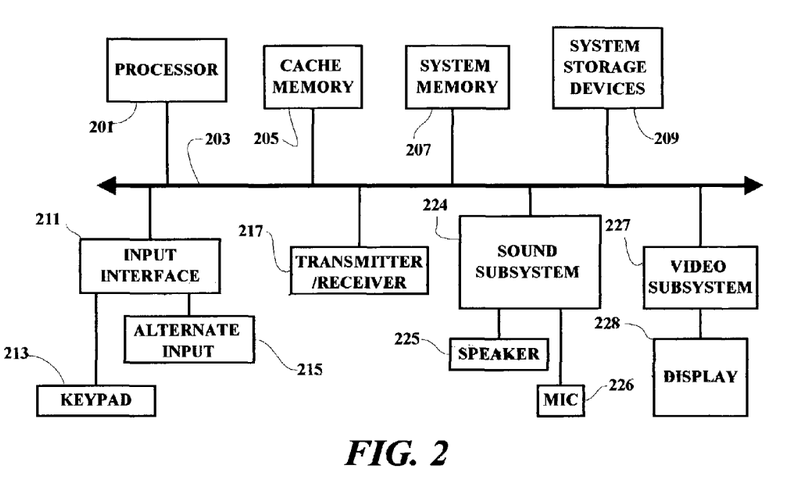
FIG. 2 is a schematic block diagram illustrating several of the major components of an exemplary user terminal connected within an Instant Messaging system.

Several of the major components of the device 101 are illustrated in FIG. 2. A processor circuit 201 is connected to a system bus 203. It is noted that the processing methodology disclosed herein will apply to many different bus and/or network configurations and is not limited to the configuration of the present example. A cache memory device 205 and a system memory unit 207 are also connected to the bus 203. The exemplary system also includes a system storage devices 209. The system bus 203 is also connected through an input interface circuit 211 to a keypad or keyboard 213 as well as alternate input devices 215 which may include voice and/or stylus input devices. The bus 203 is also coupled to a transmitter/receiver section 217 which enables the receipt and transmission of digital information. The illustrated system may also be coupled to a network system through the transmitter/receiver section 217. The exemplary system also includes a sound subsystem 224. Input means such as a microphone 226 and output means such as speaker 225 may also be included to enable a user to communicate with the device using voice commands and voiced menu and message playbacks. A video subsystem 227, which may include a graphics subsystem, is connected between the bus 203 and a display device 228.

Typically in a chat session, a user logs on to the system and selects a "chat application" to join. When the user joins the selected chat application, the fact that the user has joined the chat application is typically "broadcast" to all on-line users or participants who have the user on their buddy list. The user's display will show a chat screen to the user. The chat screen includes a chat window which displays all of the commentary that is being typed and entered by all of the users participating in the chat session at that time. When a user enters the chat application, the fact that the user has joined the chat session and is now in the chat application appears on all of the screens of all of the other participants so that all participants are aware when a new user joins the chat session. In another window, all of the current participants are displayed and when one of the participants logs off, that fact is also broadcast to all of the remaining participants and the exiting user's name is deleted from the current participants list.

Figure 3:
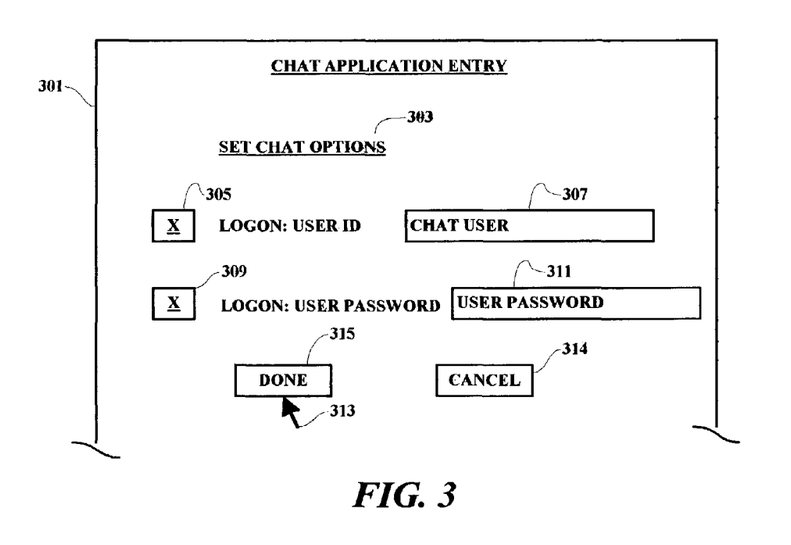
FIG. 3 is an illustration of a display screen which may be used to enable user selection of several user preferences to be applied in user chat sessions in an exemplary embodiment of the present invention.

In the exemplary embodiment which is illustrated beginning with FIG. 3, a user is enabled to select certain options before signing into any selected chat session. As shown, a chat application entry screen 301 includes a "Set Chat Options" menu item 303 which may be selected by a user to set certain options prior to entering a chat session. If the user does not wish to pre-select any available chat options as hereinafter discussed, and use the default or previously set options, the user may select to directly logon to a chat session from the screen 301 by checking blocks 305 and 309 and entering the user identification (ID) 307 and the user password 311, respectively. The user may then "point and click" on the "Done" block 315 using a pointer 313. A "Cancel" icon 314 is also displayed to enable the user to cancel the chat application entry process.

Figure 4:
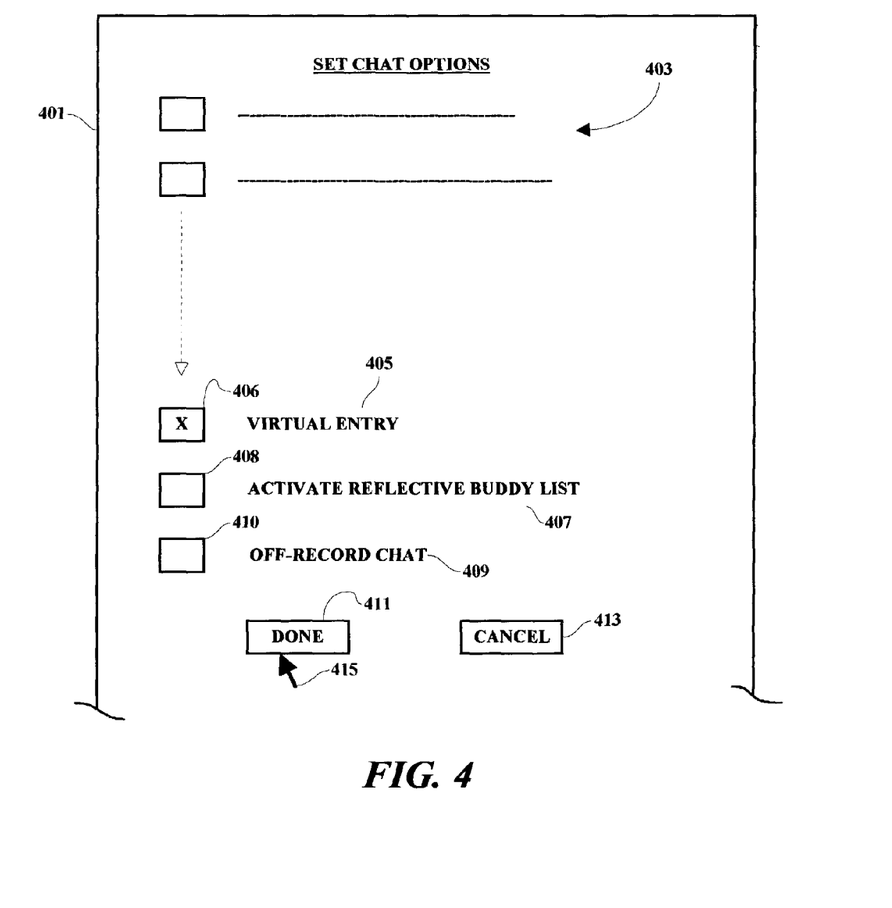
FIG. 4 is an illustration of a display screen which enables a user to select one of several optional operational enhancements within a chat session.

When a user selects the "Set Chat Options" 303 item from the Chat Application Entry screen 301, the "Set Chat Options" screen 401 is presented. This screen will include a plurality of options 403 which may be selected by the user prior to signing on to a chat session. Among other selectable options, the present example includes a "Virtual Entry" option 405, an "Activate Reflective Buddy List" option 407 and/or an "Off-Record Chat" option 409. Any of these options may be selected by checking off the corresponding block 406, 408 and 410, respectively, and then pointing and clicking on the "Done" block 411 using the pointer 415.

The "Virtual Entry" option 405 will enable a user to enter a chat session without "being seen", i.e. without his presence being broadcast to all of the active participants. The names on the users buddy list are read locally without distributing the on-line status of the user and only after the user has made selections with respect to broadcast behavior for the current session would the broadcast function be enabled.

The "Activate Reflective Buddy List" 407 option will enable the user to see which of the participants are currently monitoring the user's on-line status as well as view the current on-line state of those users. This function would not necessitate the local user to add all remote monitoring users to the user's own buddy list, although that could be one implementation. Rather, in the preferred implementation, the local user's chat application would be automatically updated with a "peer link" whenever a remote user added them to their buddy list. For purposes of the present disclosure the terms "Reflective Buddy List" and "Peer List" mean the same thing and are used interchangeably. This "Peer List" could then be an optionally viewed part of the chat dialog box, or could be a pull down menu to be viewed at the local user's discretion. The mechanism for viewing this data would include enquiries placed to the central server where buddy list status would be recorded and then passed to the individuals in question. An exemplary implementation of a Peer List is hereinafter explained in more detail in connection with FIG. 13.

In the "Off-Record" mode, there may be many implementation options. Such options include encryption, disabling of certain remote end functions during a secure chat session, (such as cut and paste), embedded metadata, or a combination of these. Additionally, the remote user may or may not be notified ahead of time that off the record mode is set for the given session.

Figure 5:
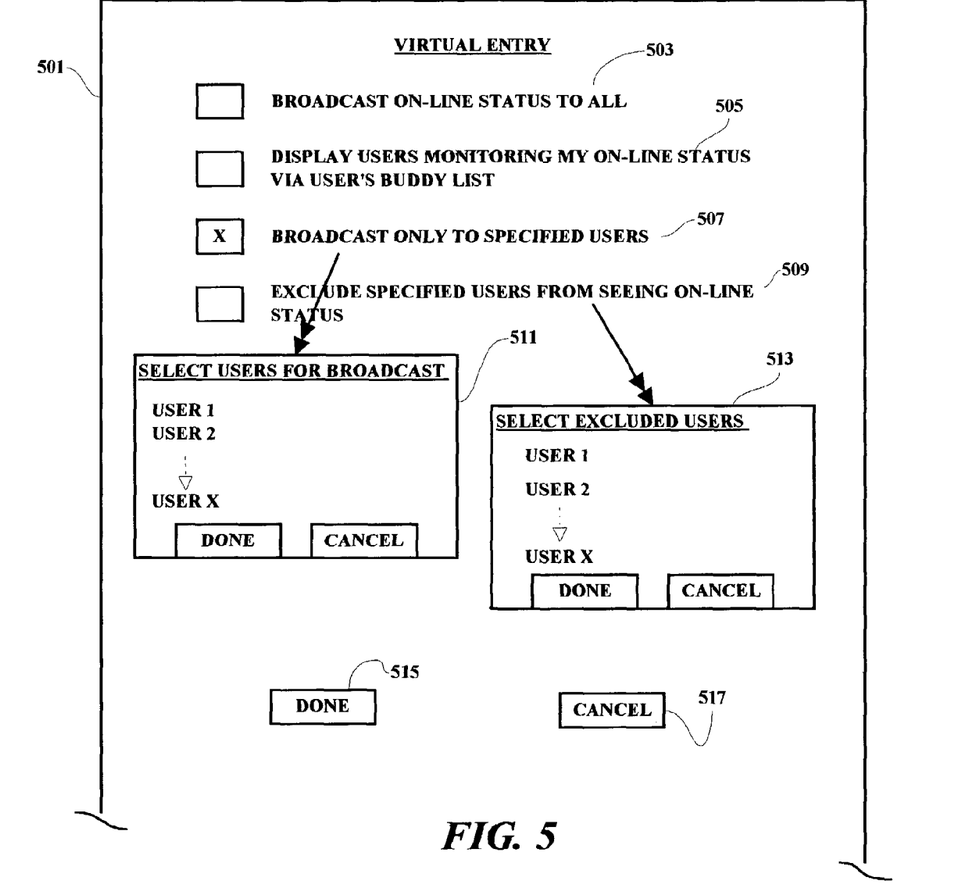
FIG. 5 is an illustration of a display screen which enables a user to select one or more features related to the virtual entry enhancement shown in FIG. 4.

From screen 401, if a user selects the Virtual Entry option 405, the Virtual Entry screen 501 is presented. This screen enables a user to select many options related to an invisible or non-broadcast participation in a chat application session. In the example, the user may select to broadcast the user's on-online status to all participants 503, and/or to display other participants who are monitoring the user's on-line status via the user's buddy list 505. The user may also select to broadcast only to specified users 507 or to exclude specified users from seeing the user's on-line status 509. If the user chooses to broadcast only to specified users 507 or to exclude specified users from seeing the user's on-line status 509, appropriate pop-up windows 511 and 513, respectively, will appear to enable the user to specify or select appropriate participants in each case. When the user is finished making his or her selections, the user may then return to the previous screen by selecting the Done block 515 or the Cancel block 517 whichever is applicable.

Figure 6:
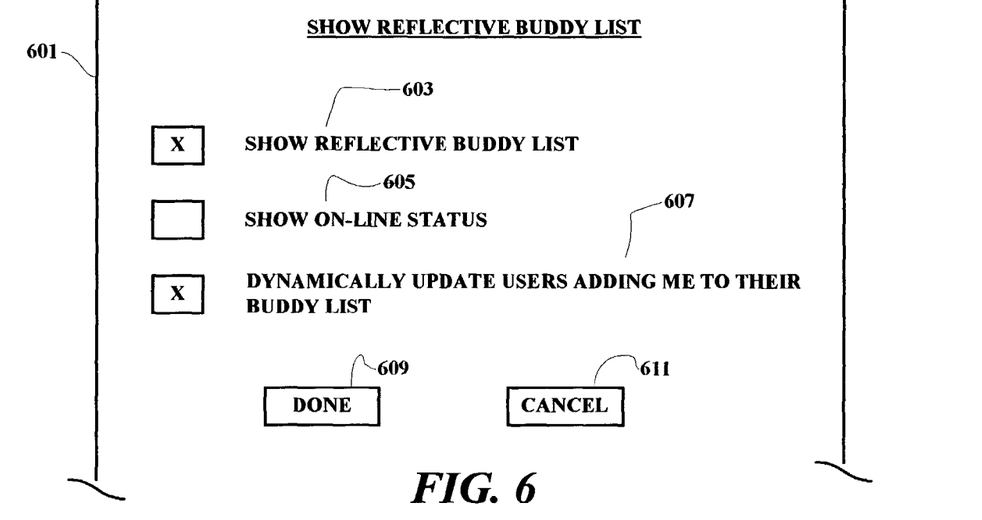
FIG. 6 is an illustration of a display screen which enables a user to select one or more features related to the virtual buddy list enhancement shown in FIG. 4.

From screen 401, if a user selects the Activate Reflective Buddy List option 407, the "Show Reflective Buddy List" screen 601 is presented. From screen 601, a user is enabled to make a selection and have the Reflective Buddy List displayed 603, or to have the users who are currently monitoring the user's on-line status displayed 605. The user is also enabled to make a selection 607 which is effective to dynamically update the user's Reflective Buddy List to include others who are adding the user to the others' buddy list. When the user has made his selections, or otherwise wishes to return to the previous screen, the user selects the Done block 609 or the Cancel block 611 as appropriate.

Figure 7:
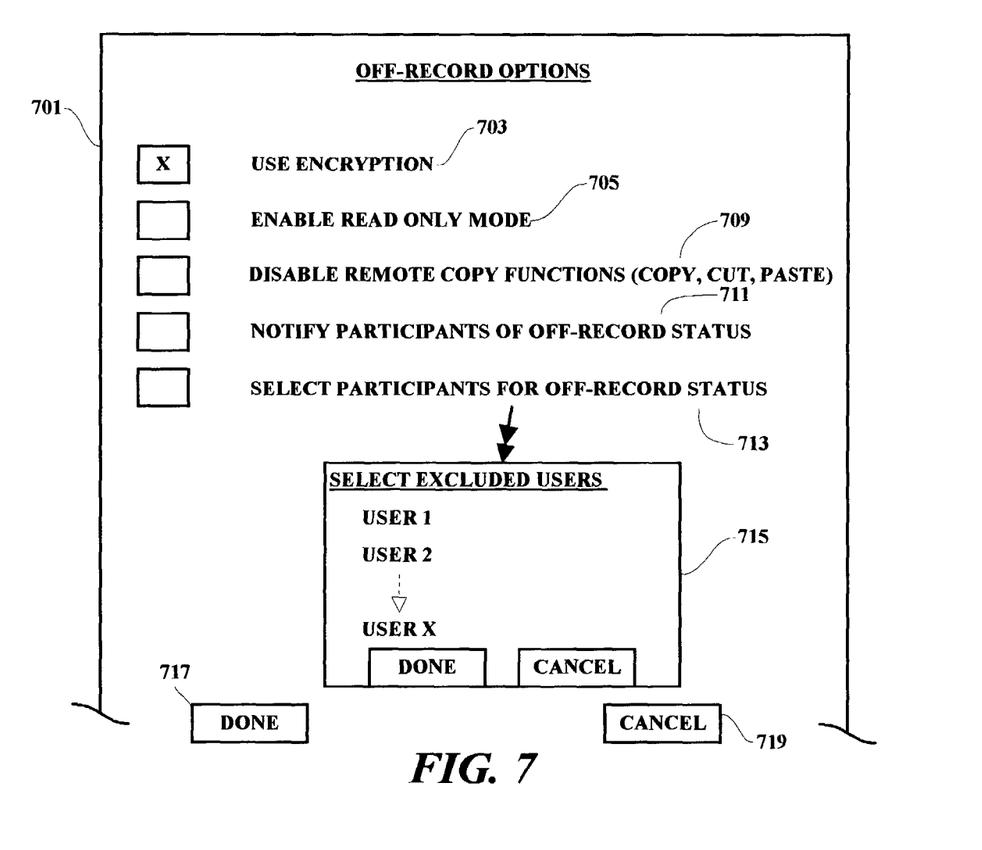
FIG. 7 is an illustration of a display screen which enables a user to select one or more features related to the off-record enhancement shown in FIG. 4.

From screen 401, if a user selects the Off-Record Chat option 409, the "Off-Record Options" screen 701 is presented. From the Off-Record screen 701, a user is enabled to select one or more options which relate to the ability of the other chat participants to copy or record what the user is entering while in the chat application. This feature allows the user to select how the other participants in the chat application see or copy what information the user is entering. The feature also enables the user to participate in the off-record mode with only a selected group of participants. As shown in FIG. 7, The user may select to use encryption 703 while participating in the chat application session in which case the user's input would be viewed as encrypted to all but certain selected participants which are designated by the user, and to whom the user's input would not be encrypted. The user may also select a read-only mode 705. Read only mode is effective to disable remote copy features such as record/save session, print and cut/paste for all participants. The user may also make selections to disable remote copy functions 709, notify participants of the fact that the user is in "Off-Record" status 711 and select other participants for the off-record mode 713. The selection of participants is accomplished in the example by means of a pop-up window 715. Upon completion of screen 701, the user may select block 717 to implement the selections or the Cancel block 719 to return to the previous screen without implementing any changes.

Figure 8:
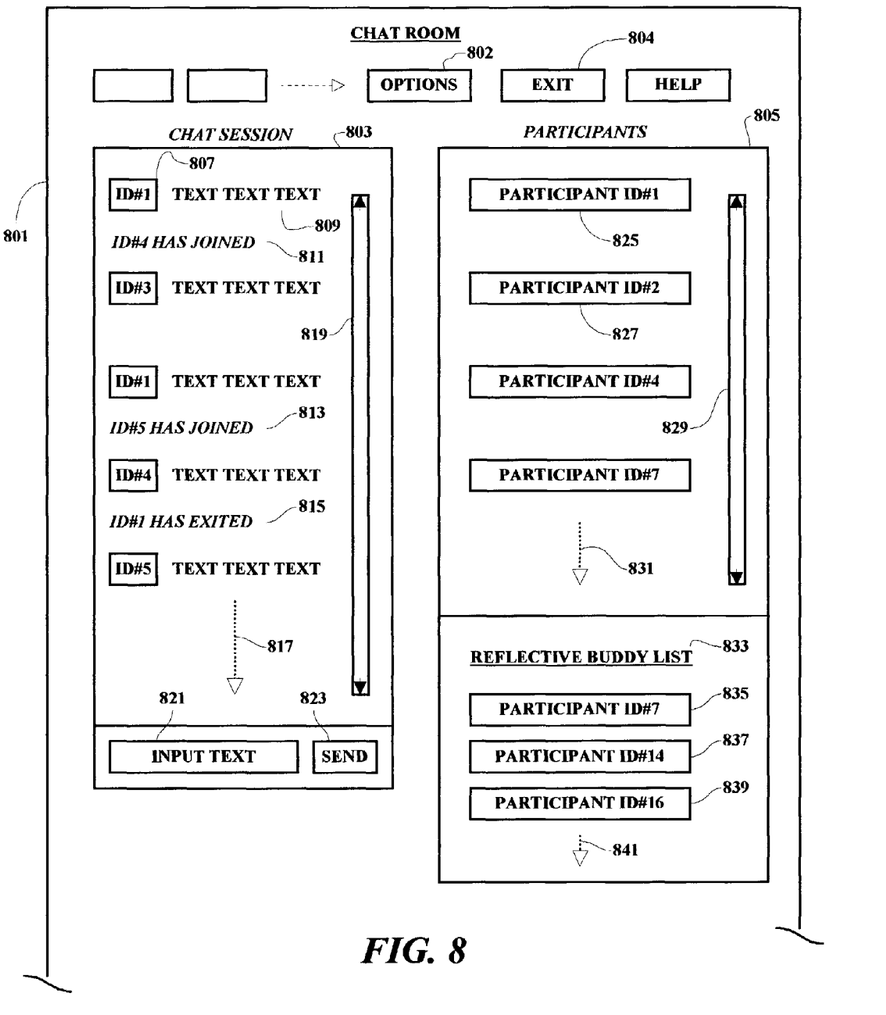
FIG. 8 is an illustration of a screen display during a chat session.

An exemplary chat application screen 801 is illustrated in FIG. 8. As shown, the displayed screen 801 includes an Options block 802 which may be selected by a user during a chat session to change the options which the user may have previously selected. This could be implemented to enable a user to make changes during a chat session in addition to the off-line changes made by the user prior to joining the chat session as previously discussed in connection with FIG. 3. Other options such as "Exit" are also available. The chat application screen 801 also includes a chat window 803 which typically displays all of the input text 809 from all of the users, and indicates which user ID 807 is generating the displayed text. The chat window also shows when a new user has joined the chat session 811, 813, and when a user has exited the chat session 815. The input text is continued 817 so long as input is provided and a scroll bar 819 may be used to scroll the inputs. A user is enabled to type in text in the input block 821 and send that text to the chat server for distribution to all other participants in the chat session by selecting the Send command 823.

In another area of the chat screen 801, a Participants Window, 805, is illustrated. The participants window includes indicia 825, 827 representative of each participant in the chat session. The list continues 831 to include all participants and a scroll bar 829 may be used to scroll up and down the list.

A Reflective Buddy List (RBL) window 833 is also shown. The RBL window 833 is separate from the Participants window 805 or the user's buddy list which is created by the user. The Reflective Buddy List shows the Participants 835, 837 and 839, who are monitoring the user by means of including the user on the other participants' buddy lists. The list is continued 841 as necessary to include all of the "Reflective Buddies" of the user.

Figure 9:
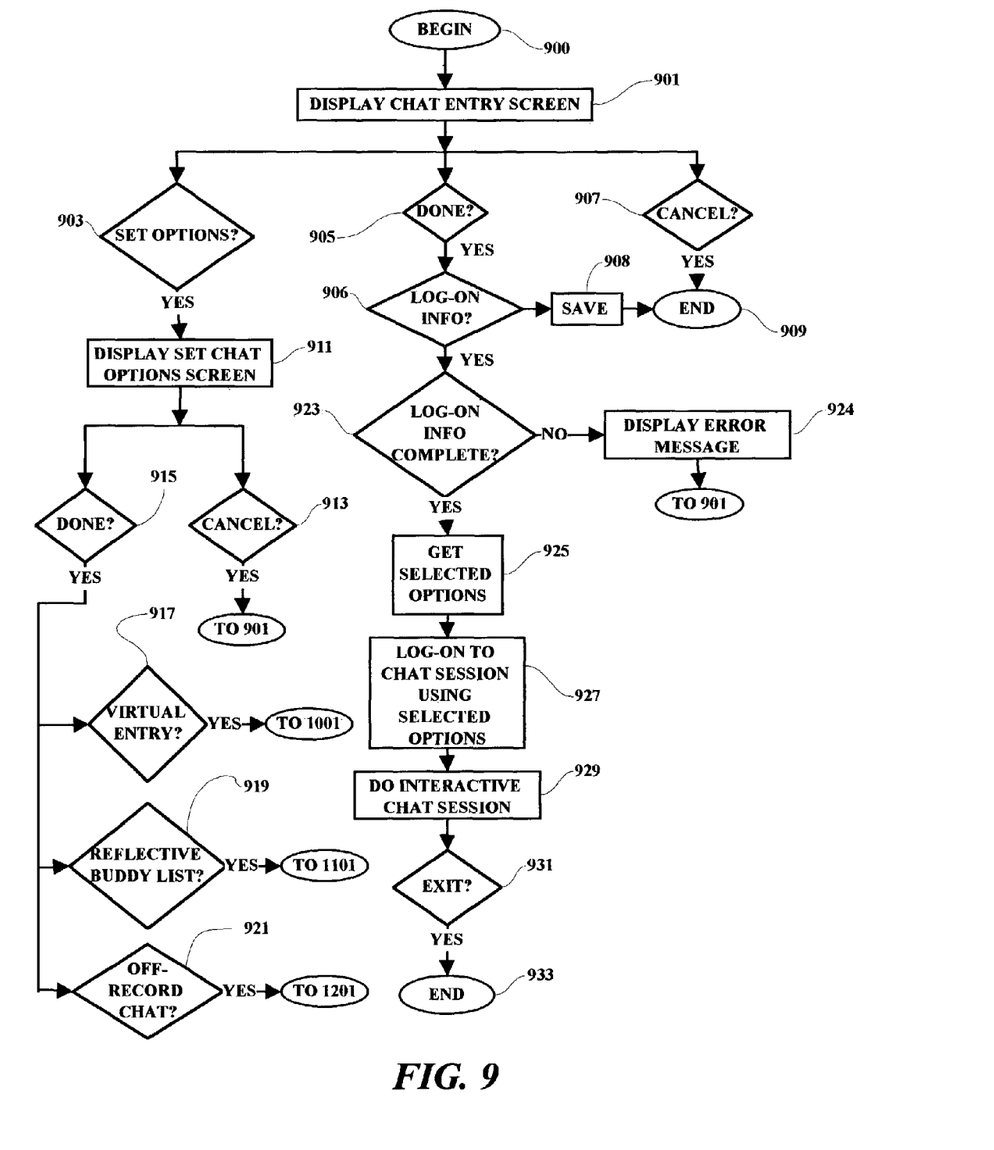
FIG. 9 is a flow chart of an overall operational sequence available to a user in an exemplary implementation of the present invention.

In FIG. 9, as the chat options processing begins 900, a chat entry screen 301 is displayed 901. From the chat entry screen, a user may log-on to a chat session, set options or cancel. If the user cancels 907 the application is ended 909. The user may also select to log-on to a chat session directly from the chat entry screen by inputting the user ID and the user password and pointing to and clicking on the "Done" block. When the user selects the Done block 905, a check is made to determine if the log-on information is complete 923. If the log-on information is not complete, an error message is displayed 924 and the processing returns to display the chat entry screen. If the Done block 315 is checked and there is no log-on information 906 in the appropriate blocks 307, 311, all selections are saved 908 as default selections and the application is terminated 909. If it is determined that the log-on information is complete 923, then the selected or default chat options are retrieved 925 and the user terminal is logged-on to the chat session 927 using the options that have previously been selected from the various "select options screens". The user then participates in the chat application session 929 and when the user wishes to exit 931, the application is terminated 933.

From the Chat Entry Screen 301, if the user selects to "Set Options" 903, then the Set Chat Options screen is presented 911. From this screen, the user may cancel at any time 913 and be returned to Chat Entry screen 901. The Set Chat Options screen enables the user to select one or more of three possible enhancement options and more detailed specific option features. The user may select a Virtual Entry option 917, a Reflective Buddy List Option 919 and/or an Off-Record Chat option 921. In any case, after the user has made an option selection 917, 919, 921, the application calls for a corresponding feature selection routine 1001, 1101, 1201, respectively, which correspond to the selected options.

Figure 10:
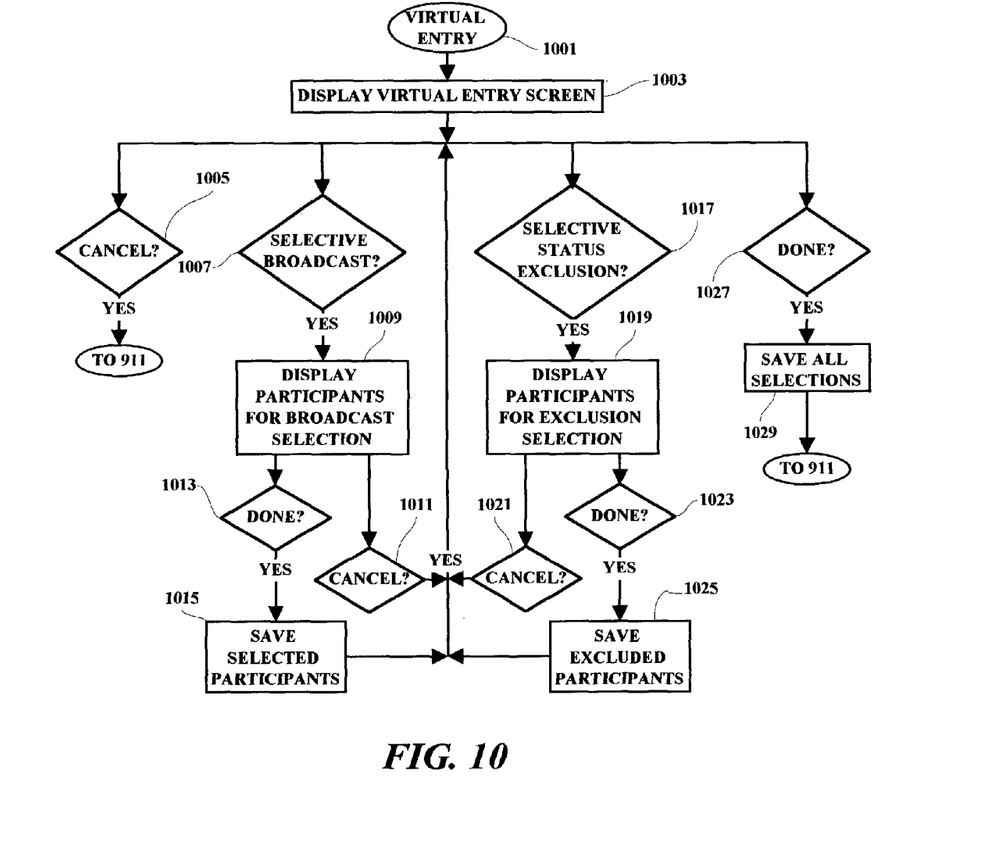
FIG. 10 is a flow chart illustration of an exemplary implementation of the virtual entry feature of the disclosed methodology.

As shown in FIG. 10, the Virtual Entry routine 1001 begins by displaying 1003 a Virtual Entry screen (501 FIG. 5). From this screen, a user may choose to cancel 1005 and be returned to the Chat Options screen 911. A user is also enabled to select a Selective Broadcast feature 1007 in which case the user is presented with a list of participants 1009 and enabled to make selections as shown in FIG. 5. When the user indicates that he or she is Done selecting Broadcast participants 1013, the selected participants are saved 1015, and the process returns to display the Virtual Entry screen 1003. The user may also cancel 1011 the operation at any time and be returned to display the Virtual Entry screen 1003.

Similarly, the user is also enabled to select a Selective Status Exclusion feature 1017 in which case the user is presented with a list of participants 1019 and enabled to make selections of those participants which the use wants to exclude as shown in FIG. 5. This exclusion pertains to the buddy list view such that, although User "A" is on User B's local buddy list, if User A designates User B to be on User A's excluded list, when the User A logs-on to a current session, the broadcast which lets other users know that User A is now on-line, is sent to all but the excluded User B (and other excluded participants). When the user indicates that he or she is Done 1023 selecting excluded participants 1023, the identity of the selected excluded participants is saved 1025, and the process returns to display the Virtual Entry screen 1003. The user may also cancel 1021 the operation at any time and be returned to display the Virtual Entry screen 1003. When the user has completed making feature selections from the Virtual Entry screen and clicks on the Done block 1027 (515 FIG. 5), all of the selections are saved 1029 and the process returns to the Display Chat Options screen 911.

Figure 11:
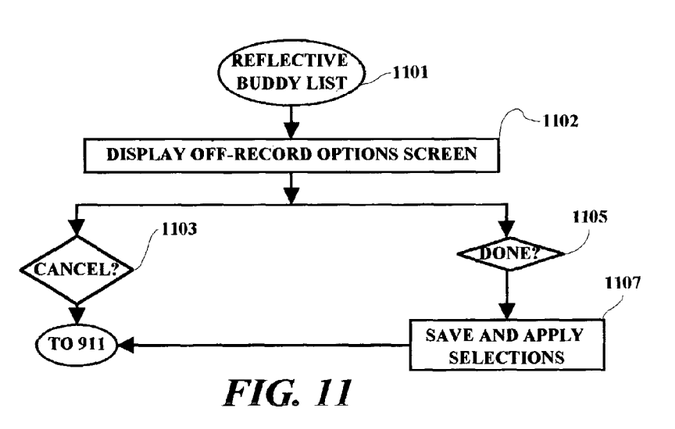
FIG. 11 is a flow chart illustration of an exemplary implementation of the reflective buddy list feature of the disclosed methodology.

As shown in FIG. 11, the Reflective Buddy List routine 1101 begins by displaying 1102 a Reflective Buddy List option screen. From this screen, a user may choose to cancel 1103 and be returned to the Set Chat Options screen 911. A user is also enabled to make other selections as shown in FIG. 6, including whether or not to show the Reflective Buddy List 603, whether or not to show the on-line status of the participants listed 605 and whether or not to dynamically update the list when a participant adds the user to participant's buddy list 607. When the user indicates that he or she is Done selecting features of the Reflective Buddy List option 1105, the selected features are saved and applied as appropriate 1107 and the process returns to display the Set Chat Options screen 911.

Figure 12:
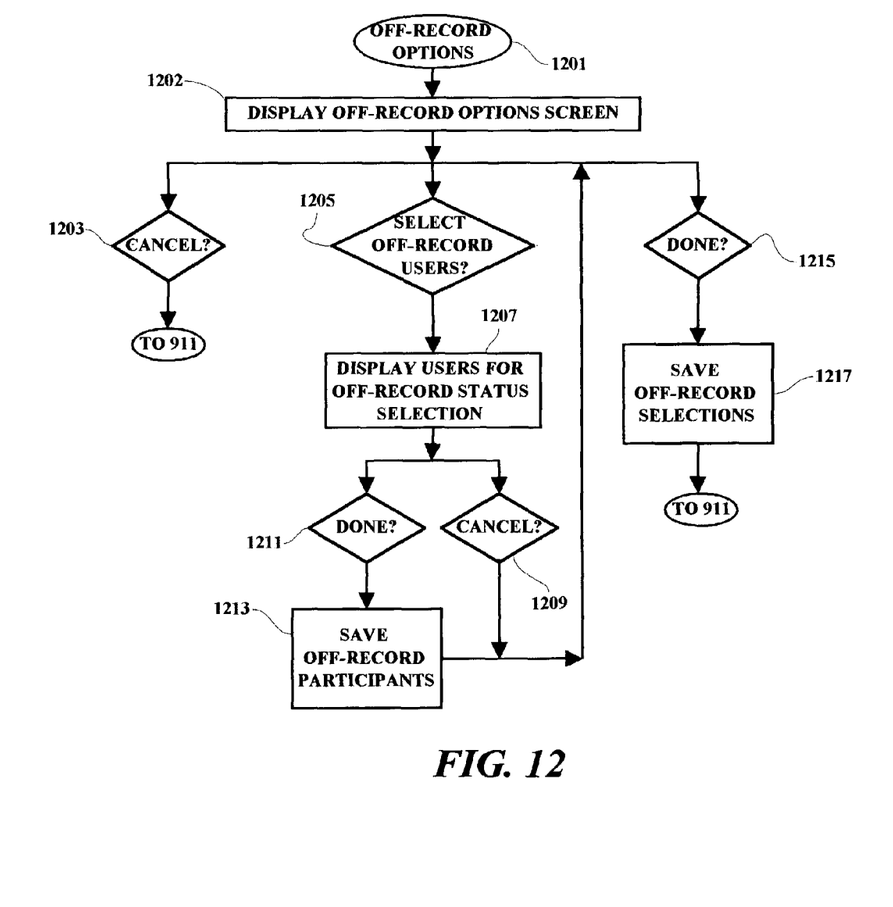
FIG. 12 is a flow chart illustration of an exemplary implementation of the off-record feature of the disclosed methodology.

As shown in FIG. 12, the Off Record Options routine 1201 begins by displaying 1202 an Off-Record Options screen (701 FIG. 7). From this screen, a user may choose to cancel 1203 and be returned to the Set Chat Options screen 911. A user is also enabled to select off-record participants 1205. If selected, a listing of users or participants is displayed 1207 and the user is enabled to select which participants are to be designated as "Off-Record" participants, i.e. those participants who will be disabled from, inter alia, copying or printing the chat input from the user. When the user indicates that he or she is Done selecting Off-Record participants 1211, the selected participants are saved 1213, and the process returns to display the Off-Record options screen 1202. The user may also select to Cancel 1209 and return to the Off-Record options screen 1202. The user is also enabled to select other Off-Record option features as shown in FIG. 7. All such selectable features as shown in FIG. 7 (i.e. Encryption, Read-Only, Disable Remote Functions, and Notify of Off-Record Status) are not repeated in FIG. 12 for the sake of simplicity. When the user indicates that he or she is Done 1215 selecting features from the Off-Record option screen 701, the selected features are saved and applied as appropriate 1217 and the process returns to display the Set Chat Options screen 911. To end the processing from the Select Options screen 401, the user can select Cancel 413 and be returned to the Chat Application Entry screen 301 from which the user may again select the Cancel block 314.

Figure 13:
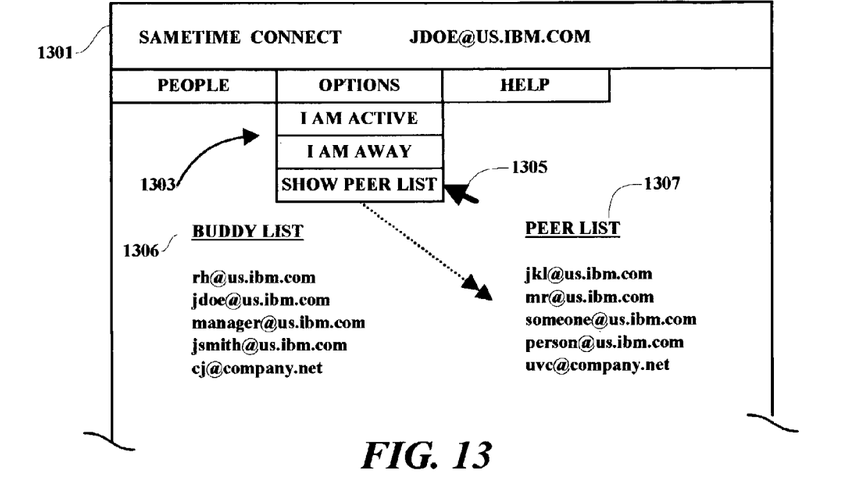
FIG. 13 is an exemplary implementation of a reflective buddy list or Peer List feature.

In FIG. 13, there is shown an example of a Peer List implementation. A chat application user display screen 1301 includes, inter alia, a standard Buddy List 1306 and also an "Options" menu item which, when selected, displays a pull-down menu 1301 with specific options. The displayed options include "I Am Active", "I Am Away" and "Show Peer List". When the "Show Peer List" option is selected, for example by using a screen pointer 1305, a "Peer List" 1307 is displayed. The Peer List 1307 shows all of the other chat application participants who have added the user to their Buddy List while the Buddy List shows all of the chat application participants whom the user has added to the user's Buddy List. The Peer List display may be part of a standard display along with the Buddy List of the user or the Peer List may be selectively activated through a pull-down menu as illustrated.

Figure 14:
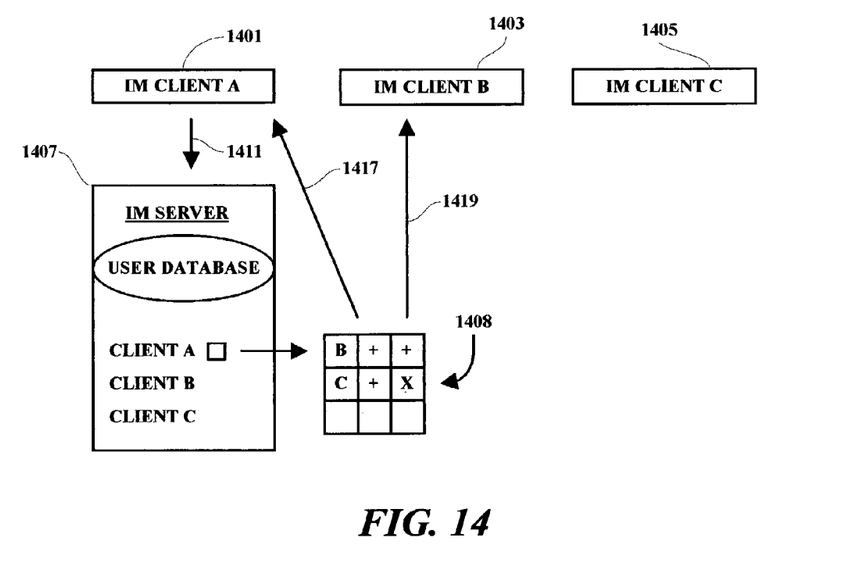
FIG. 14 is an illustration showing the communications flow between the IM client and its associated IM Server.

FIG. 14 is an illustration showing a communications flow between an IM client 1401, 1403, 1405 and its associated IM Server 1407. A bitmap 1408 is included in the IM server database. The chat server database also includes Buddy List and Peer List information for all chat participants. When a user adds an individual to the user's buddy list, that information is maintained at the chat server and is accessed to provide both a buddy list to a user and also a Reflective Buddy List or Peer List to the user. The bitmap 1408 indexes the local client to its peers. In the bitmap 1408, a "+" indicates an active state, and an "X" indicates a blocked state. The first column indicates the Peer, the second column indicates the enablement state for the reflective function and the third column in the bitmap 1408 indicates the enablement state for the broadcast function. As shown, Client A is enabled for reflective and broadcast communication with Client B as indicated by both "+" signs in the first row. The second row of the bitmap 1408 indicates that Client A is enabled ("+") for reflective function but disabled ("X") for the broadcast function with Client C. By default, in the present example, all newly mapped peer relationships are blocked for remote broadcast and enabled for reflective view. Options for peer relationships are selected and locally saved on Client A. IM Client A informs the IM server of all selection changes in the relationships with other clients such as Clients B and C. The IM server updates the peer relationship bitmap 1408 and broadcasts based on the bitmap. In the illustration, upon Client A log-in, Client A would see both Client B and Client C in Client A's Reflective Buddy List because Client B and Client C had previously added Client A to their Buddy List. Client B would see the broadcast when Client A becomes active because Client A had previously enabled Client B for broadcast reception (Bitmap 1408 row 1 column 3). Client C would not see the broadcast when Client A becomes active because Client A had previously disabled Client C from broadcast reception (Bitmap 1408 row 2 column 3).

The method and apparatus of the present invention has been described in connection with a preferred embodiment as disclosed herein. The disclosed methodology may be implemented in a wide range of sequences, menus and screen designs to accomplish the desired results as herein illustrated. Although an embodiment of the present invention has been shown and described in detail herein, along with certain variants thereof, many other varied embodiments that incorporate the teachings of the invention may be easily constructed by those skilled in the art, and even included or integrated into a processor or CPU or other larger system integrated circuit or chip. The disclosed methodology may also be implemented solely or partially in program code stored in a portable or fixed memory device, such as so-called "Flash" memory, from which it may be loaded into other memory devices and executed to achieve the beneficial results as described herein. Accordingly, the present invention is not intended to be limited to the specific form set forth herein, but on the contrary, it is intended to cover such alternatives, modifications, and equivalents, as can be reasonably included within the spirit and scope of the invention.

What is claimed is:

1. A method for providing enhanced user participation in a chat application, said chat application being selectively operable wherein a user is enabled, after logging on to said chat application, to input information at a user terminal and said information is caused to be immediately displayed on display devices of other individuals participating in said chat application, said method comprising:

providing a selection menu to said user prior to said logging on to said chat application; and     enabling said user to make a selection from said menu to disable predetermined functions of said other individuals with respect to information input by said user after logging on to said chat application.

2. The method as set forth in claim 1 and further including encrypting said information input by said user.

3. The method as set forth in claim 1 and further including enabling selections by said user to indicate selected ones of said other individuals wherein only said predetermined functions of said selected ones are disabled.

4. The method as set forth in claim 3 and further including:

presenting a listing of said other individuals for selection by said user whereby said predetermined functions are disabled only for user selected individuals.

5. The method as set forth in claim 4 wherein said listing comprises a reflective buddy list of said user, said reflective buddy list including only such of said individuals who have added said user to said individuals' buddy list.

6. The method as set forth in claim 1 and further including notifying said other individuals of said disabled predetermined functions implemented by said user with respect to said other individuals.

7. The method as set forth in claim 6 wherein said user is enabled to select only selected individuals to be notified of said disabled functions.

8. The method as set forth in claim 1 wherein said user selection is effective to cause said user input information to be provided to said other individuals in a read-only mode.

9. The method as set forth in claim 1 wherein said predetermined functions include a copy function.

10. The method as set forth in claim 1 wherein said predetermined functions include a cut and paste function.

11. The method as set forth in claim 1 wherein said predetermined functions include a print function.

12. A storage medium including machine readable coded indicia, said storage medium being selectively coupled to a reading device, said reading device being selectively coupled to processing circuitry within a computer system, said reading device being selectively operable to read said machine readable coded indicia and provide program signals representative thereof, said program signals being effective for providing enhanced user participation in a chat application, said chat application being selectively operable wherein a user is enabled, after logging on to said chat application, to input information at a user terminal and said information is caused to be immediately displayed on display devices of other individuals participating in said chat application, said program signals being further effective for:

providing a selection menu to said user prior to said logging on to said chat application; and     enabling said user to make a selection from said menu to disable predetermined functions of said other individuals with respect to information input by said user after logging on to said chat application.

13. The medium as set forth in claim 12 wherein said program signals are further effective for encrypting said information input by said user.

14. The medium as set forth in claim 12 wherein said program signals are further effective for enabling selections by said user to indicate selected ones of said other individuals wherein only said predetermined functions of said selected ones are disabled.

15. The medium as set forth in claim 14 wherein said program signals are further effective for:

presenting a listing of said other individuals for selection by said user whereby said predetermined functions are disabled only for user selected individuals.

16. The medium as set forth in claim 15 wherein said listing comprises a reflective buddy list of said user, said reflective buddy list including only such of said individuals who have added said user to said individuals' buddy list.

17. The medium as set forth in claim 12 wherein said program signals are further effective for notifying said other individuals of said disabled predetermined functions implemented by said user with respect to said other individuals.

18. The medium as set forth in claim 17 wherein said user is enabled to choose only selected individuals to be notified of said disabled functions.

19. The medium as set forth in claim 12 wherein said user selection is effective to cause said user input information to be provided to said other individuals in a read-only mode.

20. The medium as set forth in claim 12 wherein said predetermined functions include a copy function.

21. The medium as set forth in claim 12 wherein said predetermined functions include a cut and paste function.

22. The medium as set forth in claim 12 wherein said predetermined functions include a print function.

23. A system for providing enhanced user participation in a chat application, said chat application being selectively operable wherein a user is enabled, after logging on to said chat application, to input information at a user terminal and said information is caused to be immediately displayed on display devices of other individuals participating in said chat application, said system comprising:

a chat server;

a plurality of chat user terminals, said chat user terminals and said chat server being coupled together through an interconnection network, each of said user terminals including a display device and a user input device, each of said user terminals being selectively operable for providing a selection menu to said user prior to said logging on to said chat application by which said user is enabled to make a selection from said menu to disable predetermined functions of said other individuals with respect to information input by said user after logging on to said chat application.

\* \* \* \* \*